(12) United States Patent
Yoshikawa

(10) Patent No.: US 10,158,800 B2
(45) Date of Patent: Dec. 18, 2018

(54) DISPLAY CONTROL DEVICE AND CONTROL METHOD THEREFOR

(71) Applicant: CANON KABUSHIKI KAISHA, Tokyo (JP)

(72) Inventor: Akio Yoshikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 14/978,899

(22) Filed: Dec. 22, 2015

(65) Prior Publication Data
US 2016/0191800 A1    Jun. 30, 2016

(30) Foreign Application Priority Data

Dec. 25, 2014 (WO) .................. PCT/JP2014/084429

(51) Int. Cl.
*H04N 5/232*    (2006.01)
(52) U.S. Cl.
CPC ..... *H04N 5/23245* (2013.01); *H04N 5/23293* (2013.01)
(58) Field of Classification Search
CPC .................. H04N 5/23245; H04N 5/23293
See application file for complete search history.

(56) References Cited

U.S. PATENT DOCUMENTS

| | | | |
|---|---|---|---|
| 2004/0036779 A1* | 2/2004 | Cazier | H04N 1/00437 348/231.2 |
| 2004/0218065 A1* | 11/2004 | Schinner | H04N 1/32122 348/231.6 |
| 2004/0263658 A1* | 12/2004 | Cozier | H04N 1/0035 348/333.01 |
| 2008/0266407 A1* | 10/2008 | Battles | G06F 9/4443 348/211.2 |
| 2009/0295743 A1 | 12/2009 | Nakajoh | |
| 2010/0033614 A1* | 2/2010 | Yoo | H04N 5/23206 348/333.02 |
| 2011/0063236 A1 | 3/2011 | Arai | |
| 2011/0063491 A1* | 3/2011 | Kim | G06F 3/005 348/333.01 |

(Continued)

FOREIGN PATENT DOCUMENTS

| | | |
|---|---|---|
| JP | 11-355617 A | 12/1999 |
| JP | 2004-340991 A | 12/2004 |

(Continued)

*Primary Examiner* — Timothy J Henn
(74) *Attorney, Agent, or Firm* — Canon U.S.A., Inc. IP Division

(57) ABSTRACT

A display control device includes a detection unit that detects a touching operation on a display portion, a control unit that performs control about an item displayed in the display portion in response to a touching operation on the item, a selection unit that selects, based on an operation, one or more items from among a plurality of items to be displayed, and a display control unit that performs control such that from among items to be displayed in a first display area and a second display area, the items selected by the selection unit are displayed in the first display area and a plurality of predetermined items are displayed in the second display area. The first display area extends along a side nearest a grip portion for holding the device, and the second display area is further from the grip portion than the first display area.

22 Claims, 11 Drawing Sheets

(56) References Cited

U.S. PATENT DOCUMENTS

| | | | | |
|---|---|---|---|---|
| 2012/0137236 | A1 | 5/2012 | Abe | |
| 2014/0368698 | A1* | 12/2014 | Matsutani | H04N 5/23296 |
| | | | | 348/240.2 |
| 2016/0224225 | A1* | 8/2016 | Kondo | H04N 5/23293 |
| 2016/0227105 | A1* | 8/2016 | Kobayashi | H04N 5/23216 |

FOREIGN PATENT DOCUMENTS

| | | | |
|---|---|---|---|
| JP | 2010-124298 A | | 6/2010 |
| JP | 2010237784 A | * | 10/2010 |
| JP | 2011-141431 A | | 7/2011 |
| JP | 2011-159180 A | | 8/2011 |
| JP | 2012-129963 A | | 7/2012 |
| JP | 2013-017088 A | | 1/2013 |
| JP | 2014002756 A | | 1/2014 |

* cited by examiner

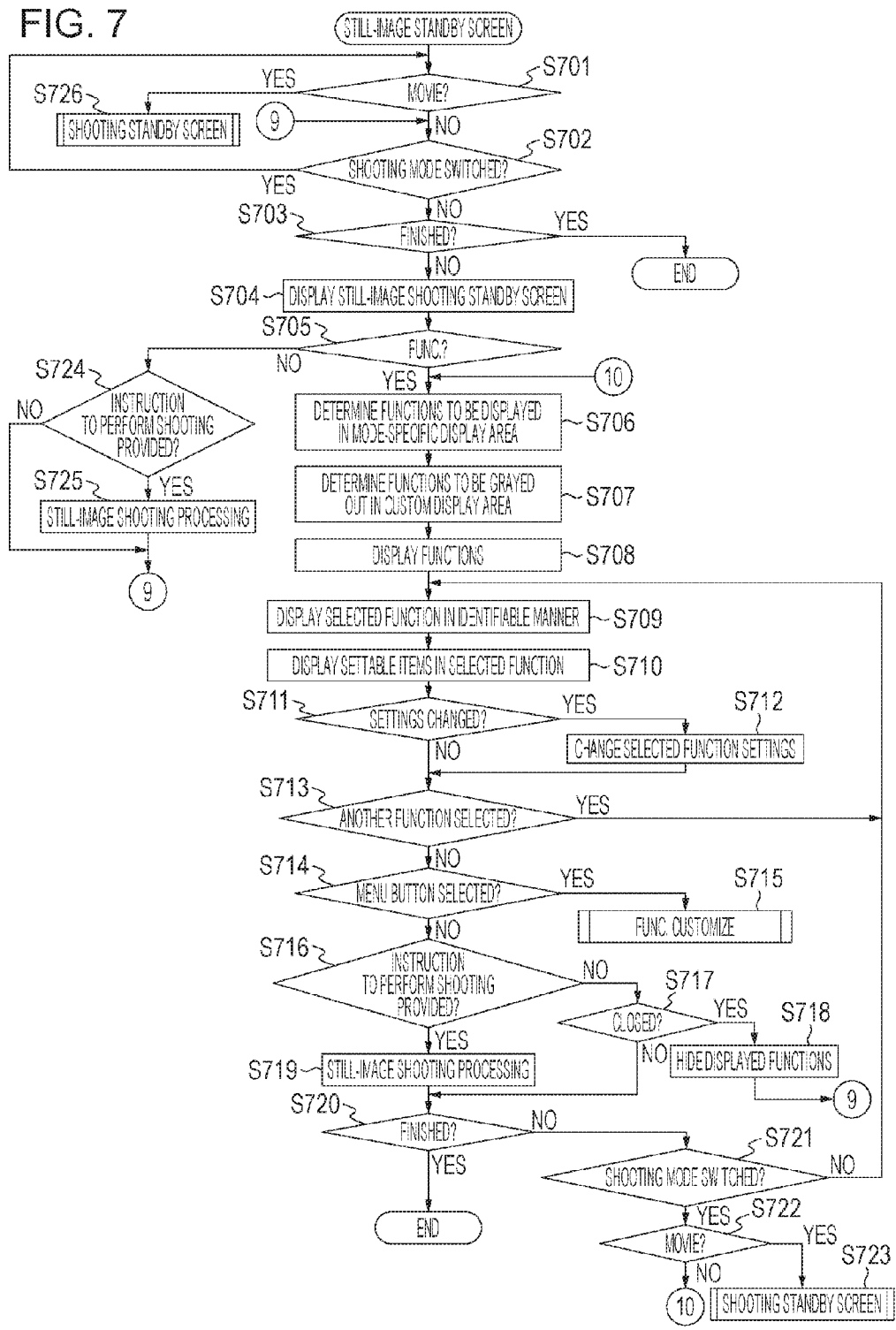

|  | 4K Movie Mode | | | HD Movie Mode | | | Still-Image Mode | | |
| --- | --- | --- | --- | --- | --- | --- | --- | --- | --- |
|  | AUTO | P/TV/AV/M | SCN | AUTO | P/TV/AV/M | SCN | AUTO | P/TV/AV/M | SCN |
| Scene Mode | × | × | ○ | × | × | ○ | × | × | ○ |
| Look | × | ○ | × | × | ○ | × | × | ○ | × |
| Audio Scene | ○ | ○ | ○ | ○ | ○ | ○ | × | × | × |
| Drive Mode | × | × | × | × | × | × | ○ | ○ | ○ |
| Metering Method | × | ○ In M: △ | × | × | ○ In M: △ | × | × | ○ In M: △ | × |
| Focus Priority | × | × | × | ○ | × | × | × | ○ | ○ |
| Self-Timer | ○ | ○ | ○ | ○ | ○ | ○ | ○ | ○ | ○ |
| Image Stabilization | ○ | ○ | × | ○ | ○ | ○ | × | ○ | ○ |
| Pre REC | × | × | ○ | ○ | ○ | ○ | × | × | × |

○··· Displayed
×··· Hided
△··· Grayed out

FIG. 10

| Function Name | Function Gray-Out Condition Content | Selectable Items | Default Content |
|---|---|---|---|
| Shutter Speed | · Other Than TV/M Modes | 1/2 To 1/2000 | |
| Iris | · Other Than AV/M Modes | F2.8 To F11.0 | |
| ISO | · Other Than M Mode | ISO100 To ISO12800 (1/3 Step Increments) | |
| Exposure Lock | · Auto Mode, M Mode | Auto/Manual: −3.0 To 3.0<br>Touch Exposure: Normal<br>Touch Exposure: Highlight | Auto |
| | | Touch Exposure: Normal/Highlight | Normal |
| Microphone Level | · In Slow Recording, Double-Speed Recording | Auto/Manual: 0 To 100 | Auto |
| Zebra | | Off/70%/100% | Off |
| MAGNIFY | | Execute | |
| Focus Peaking | | On/Off | Off |
| | | Monochrome In Focus Peaking: On/Off | Off |
| | | Focus Peaking Color: Red/Blue/Yellow | Red |
| White Balance | | AWB/Daylight/Shade/Cloudy/Fluorescent<br>Fluorescent H/Tungsten/Flash<br>Color Temperature: 2000 K To 15000 K<br>Set 1: White-Capture<br>Set 2: White-Capture | AWB |
| Powered IS | | On/Off | Off |
| Digital Teleconversion | | On/Off | Off |
| AE Shift | · During Exposure Lock Or Touch Exposure Setting<br>· Auto Mode, M Mode | ±3.0 | ±0 |
| Focus | · In AF Mode<br>· During Touch Tracking | None | |

FIG. 11

| Function Name | Function Gray-Out Condition | | Default |
|---|---|---|---|
| | Content | Selectable Items | Content |
| Scene Mode | · During Movie Shooting | Portrait/Sports/Night Scene Snow/Beach/Sunset/Low Light Spotlight/Aerial Fireworks | Portrait |
| Look | · During Movie Shooting | Standard/Wide DR Monochrome/User-Defined 1 User-Defined 2/Log | Standard |
| Audio Scene | · During Movie Shooting | Standard/Music/Speech Forest And Wild Birds/Noise-Suppressed/Custom Festival/Meeting | Standard |
| Drive Mode | · Only Still Image | Single Shooting/Continuous Shooting/AF Continuous Shooting | Single Shooting |
| Metering Method | · During Movie Shooting | Standard/Spotlight Backlight | Standard |
| Focus Priority | · During Movie Shooting | AIAF/Fixed To Center/Off | AIAF |
| Self-Timer | · Recording Disabled State (e.g., Without Card)<br>· During Movie Shooting | Off/2 Sec./10 Sec. | Off |
| Image Stabilization (Movie) | · During Movie Shooting | Dynamic/Standard/Off | Dynamic |
| Pre REC | · In Slow Recording, Double-Speed Recording<br>· Recording Disabled State (e.g., Without Card)<br>· During Snapshot Recording Setting<br>· During Movie Shooting | On/Off | Off |

DISPLAY CONTROL DEVICE AND CONTROL METHOD THEREFOR

TECHNICAL FIELD

Aspects of the present invention generally relate to techniques for controlling displaying items whose settings are specified at the time of shooting.

BACKGROUND ART

The number of items that can be displayed in an area in a display portion in an image pickup device or the like is limited, and there is a need to arrange such a limited number of displayed items with a high level of usability.

PTL 1 describes setting an area for displaying operation buttons in a touch-panel display portion in a camera that can be gripped from both the left and the right, depending on the right or the left from which the camera is gripped. PTL 2 describes being able to switch displaying and hiding buttons in a touch-panel portion and to change a displayed position.

CITATION LIST

Patent Literature

PTL 1: Japanese Patent Laid-Open No. 2004-340991
PTL 2: Japanese Patent Laid-Open No. 2011-159180

In the display method described in PTL 1, because items are displayed in a location that allows a user to easily change the settings of the items by a touching operation in accordance with a gripped position, they can easily operate the camera by their hand gripping it. However, in the display method described in PTL 1, items are displayed in an area on a gripped side, whereas no items are displayed in other areas, and the number of displayed images is not large. There is no discussion about which items should be displayed in each of the area on the gripped side and the other areas to achieve a high level of usability when it is necessary to display many items by using the other areas in addition to the area on the gripped side.

With the display method in PTL 2, the user can enable a desired item to be displayed at a desired position (or area) on the left or right end in the display portion. However, there is a possibility that items may not be displayed so as to have a high level of usability in a state where the user aims the digital camera, unless they determines the displayed position in consideration of the ease-of-use when they aims the digital camera.

SUMMARY

Aspects of the present invention provide a display control device with improved usability for items displayed in a state where a user holds and aims the device.

A display control device according to aspects of the present invention includes a detection unit, a control unit, a selection unit, and a display control unit. The detection unit is configured to detect a touching operation on a display portion. The control unit is configured to perform control about an item displayed in the display portion in response to a touching operation on the item. The selection unit is configured to select, based on an operation, one or more items from among a plurality of items to be displayed. The display control unit is configured to perform control such that from among items to be displayed in a first display area and a second display area. The items selected by the selection unit are displayed in the first display area, and a plurality of predetermined items are displayed in the second display area. The first display area extends along a side nearest a grip portion for holding the device from among sides of the display portion. The second display area is further from the grip portion than the first display area.

Further features of the present disclosure will become apparent from the following description of exemplary embodiments with reference to the attached drawings.

BRIEF DESCRIPTION OF DRAWINGS

FIG. 7 is a flowchart that illustrates processing for displaying a shooting standby screen for still images according to the present embodiment.

FIGS. 8A-8E includes illustrations of example shooting standby screens in the present embodiment.

FIG. 9 illustrates whether functions are displayed in a mode-specific display area on a shooting-mode basis.

FIG. 10 illustrates conditions for graying-out functions displayed in a custom display area.

FIG. 11 illustrates conditions for graying-out functions displayed in the mode-specific display area.

DESCRIPTION OF EMBODIMENTS

Exemplary embodiments of the present invention are described below with reference to the drawings.

Figure 1A:
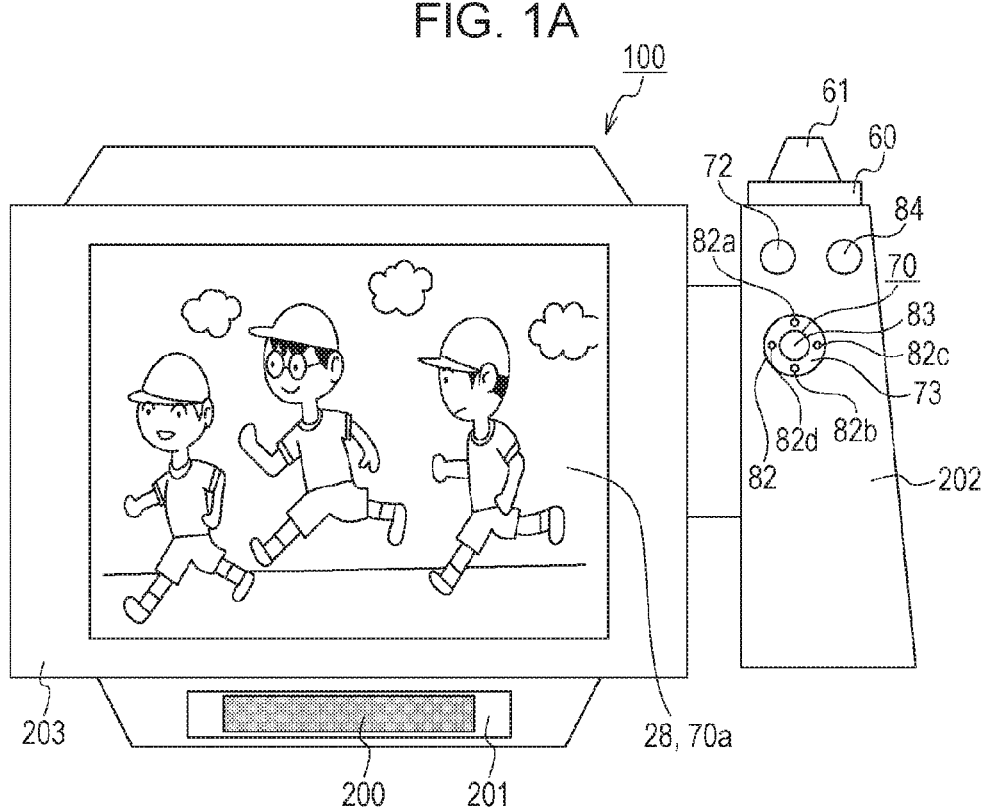
FIGS. 1A and 1B includes external views of a digital camera as one example of a device in which a configuration in an embodiment can be used.
Figure 1B:
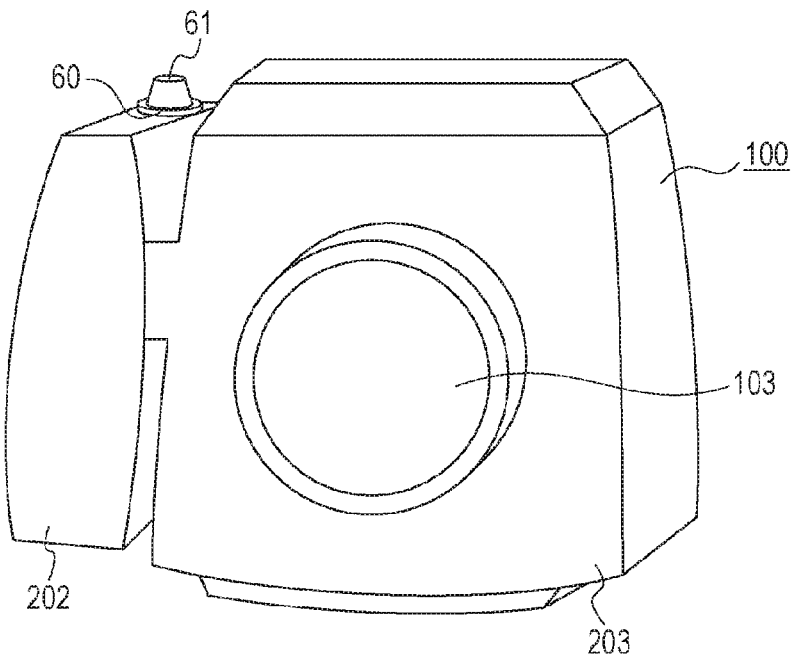

FIGS. 1A and 1B are external views of a digital camera 100 as one example of a display control device according to an aspect of the present invention. The digital camera 100 is broadly divided into a main body portion 203 and a grip portion 202. FIG. 1A is an external view of the digital camera 100 as seen from the side on which a display portion 28 is positioned. FIG. 1B is an external view of the digital camera 100 as seen from the side on which an image pickup lens 103 is positioned.

The display portion 28 is included in the main body portion 203 and is a display portion that displays images and various kinds of information. A touch panel 70a capable of detecting a touching operation is arranged such that it is superimposed on the display portion 28.

A shutter button 61, which is included in the grip portion 202, is an operating portion (shooting instruction portion) for providing a shooting instruction. A mode selection switch 60 is an operating portion for switching a currently used mode among various modes. An operating portion 70 is an operating portion including operating members that receive various operations from a user, such as various switches, buttons, and a touch panel. A control wheel 73 is an operating member that is included in the operating portion 70 and that can be operated by rotation. A four-way D-pad key 82 is arranged on the control wheel 73 and includes up, down, left, and right buttons allowing the user to move a selection item by pressing them. A SET button 83 is disposed in the center of the control wheel 73 and the D-pad 82 and is an operating portion for setting an item as a currently selected item. When a menu button 84 is pressed, a menu screen appears in the display portion 28, and the menu screen allows the user to specify the settings about shooting and to switch the mode thereon. A power supply switch 72 is a push button for switching between power-on and power-off. A storage medium 200 is a storage medium, such as a memory card or hard disk. A storage medium slot 201 is a slot for accommodating the storage medium 200. The storage medium 200 accommodated in the storage medium slot 201 can communicate with the digital camera 100 and allows data to be recorded therein and played back therefrom. FIG. 1A illustrates a state where the lid is opened and a part of the storage medium 200 is extracted and exposed from the storage medium slot 201. The image pickup lens 103 is a lens for obtaining an image of an object. FIG. 1B illustrates a case where the image pickup lens 103 is attached. The image pickup lens 103 may be detached.

Figure 2:
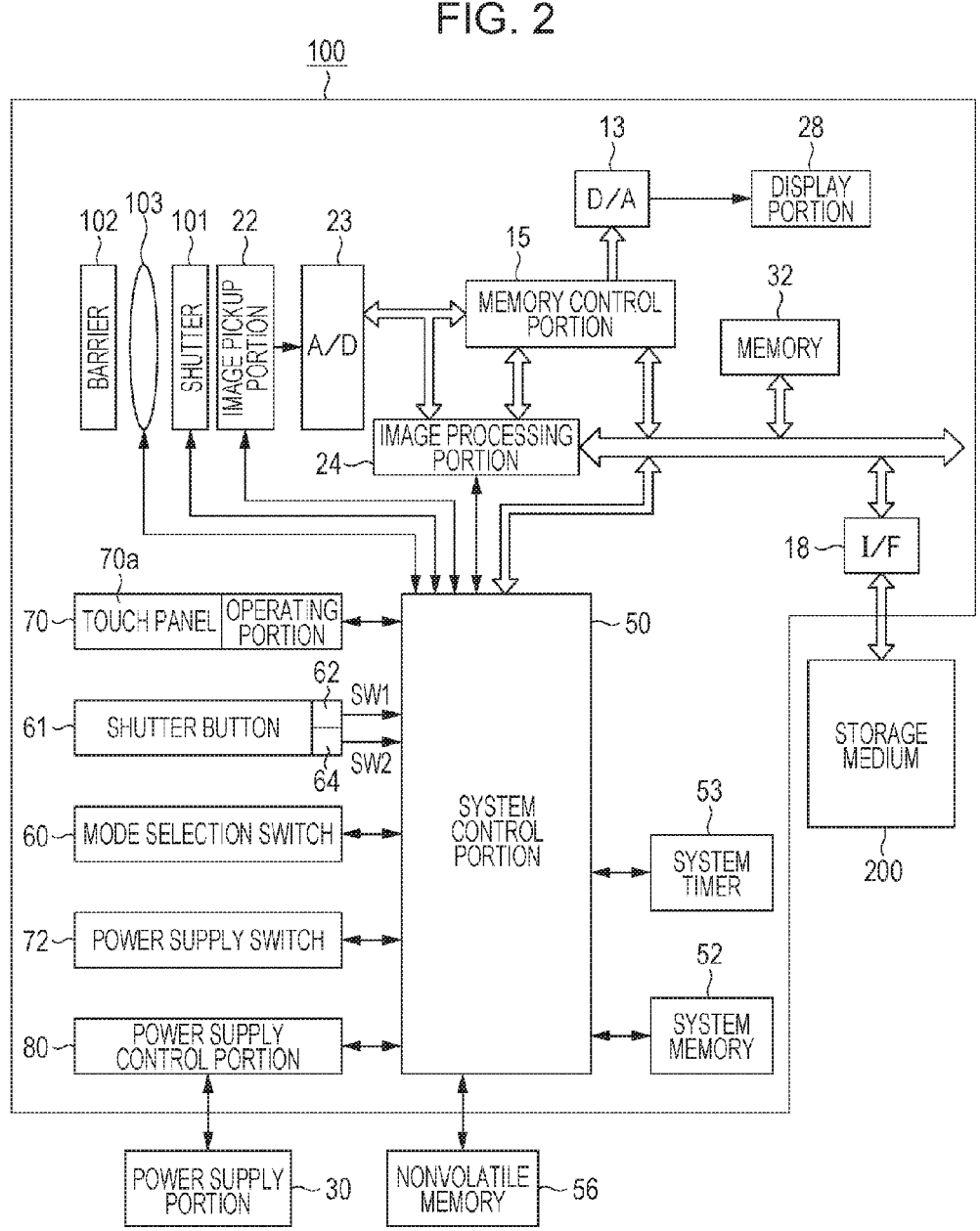
FIG. 2 is a block diagram that illustrates a configuration example of the digital camera as one example of the device in which the configuration in the embodiment can be used.

FIG. 2 is a block diagram that illustrates a configuration example of the digital camera 100 according to the present embodiment.

In FIG. 2, the image pickup lens 103 is a group of lenses, including a zoom lens and a focus lens. A shutter 101 is a shutter having the iris function. An image pickup portion 22 is an image pickup element that converts an optical image into electric signals and that includes a charge-coupled device (CCD), complementary metal-oxide semiconductor (CMOS) element, or the like. An analog-to-digital (A/D) converter 23 converts analog signals into digital signals. The A/D converter 23 is used to convert analog signals output from the image pickup portion 22 into digital signals. A barrier 102 can prevent stains or breakage of the image pickup system, including the image pickup lens 103, shutter 101, and image pickup portion 22, by covering the image pickup system, including the image pickup lens 103.

An image processing portion 24 performs processing, such as predetermined pixel interpolation, size processing, typified by reduction, or color conversion, on data from the A/D converter 23 or data from a memory control portion 15. The image processing portion 24 performs predetermined computation processing by using data of a picked-up image, and a system control portion 50 performs exposure control and distance-measuring control based on the obtained computation result. This enables automatic focus (AF) processing, automatic exposure (AE) processing, and pre-flash (EF) processing in through-the-lens (TTL) system. The image processing portion 24 further performs predetermined computation processing by using the data of the picked-up image and also performs automatic white balance (AWB) processing in TTL system based on the obtained computation result.

Data output from the A/D converter 23 is written into a memory 32 through the image processing portion 24 and the memory control portion 15 or written directly into the memory 32 through the memory control portion 15. The memory 32 stores image data in which data obtained by the image pickup portion 22 is converted into digital data by the A/D converter 23 and image data to be displayed in the display portion 28. The memory 32 has a sufficient storage capacity to store a predetermined number of still images and movie and sound in a predetermined period.

The memory 32 is also used as a memory for displaying images (video memory). A digital-to-analog (D/A) converter 13 converts data for displaying images stored in the memory 32 into analog signals and supplies them to the display portion 28. In this way, the image data for displaying images written in the memory 32 is sent to the display portion 28 through the D/A converter 13 and displayed by the display portion 28. The display portion 28 performs displaying on a display, such as a liquid crystal display (LCD), in accordance with the analog signals from the D/A converter 13. Digital signals, which are once converted from analog signals and then stored in the memory 32, are converted into analog signals in the D/A converter 13, they are successively transferred to the display portion 28 and the image is displayed, thus allowing the display portion 28 to function as an electronic viewfinder and enabling through-image-displaying (live view displaying).

A nonvolatile memory 56 is a memory as a storage medium from which data is electrically erasable and recordable. One example of the nonvolatile memory 56 is an electrically erasable programmable ROM (EEPROM). The nonvolatile memory 56 stores constants for use in operations of the system control portion 50, programs, and the like. The programs used here indicate computer programs for use in executing flowcharts described below in the present embodiment.

The system control portion 50 controls the overall digital camera 100. By executing a program stored in the nonvolatile memory 56 described above, each processing described below in the present embodiment is achieved. A random-access memory (RAM) is used as a system memory 52. Constants and variants for use in operations of the system control portion 50, programs read from the nonvolatile memory 56, and the like are developed in the system memory 52. The system control portion 50 also controls displaying by controlling the memory 32, D/A converter 13, display portion 28, and the like.

A system timer 53 is a time measuring portion that measures time for use in various controls or time in an incorporated clock.

The mode selection switch 60, shutter button 61, and operating portion 70 are an operating unit for inputting various operation instructions into the system control portion 50.

The mode selection switch 60 switches the operation mode of the system control portion 50 to a still image mode, movie mode, play-back mode, or the like. The still image mode may include an automatic shooting mode, automatic scene determination mode, manual mode, various scene modes having their respective shooting settings corresponding to the shooting scenes, program AE mode, custom mode, and the like. By the use of the mode selection switch 60, the operation mode can be directly switched to any one of the above modes included in the menu button. Alternatively, after the selection is once switched to the menu button by the use of the mode selection switch 60, the operation mode may be switched to any one of the above modes included in the menu button by the use of another operating member. Similarly, the movie mode may include a plurality of modes. A first shutter switch 62 is turned on when the shutter button 61 disposed on the digital camera 100 is operated in partway, so called, it is pressed halfway down (shooting preparation instruction), and a first shutter switch signal SW1 is generated. The first shutter switch signal SW1 activates operations, such as the AF processing, AE processing, AWB processing, and EF processing.

A second shutter switch 64 is turned on when the operation of the shutter button 61 is completed, so called, it is pressed all the way down (shooting instruction), and a second shutter switch signal SW2 is generated. In response to the second shutter switch signal SW2, the system control portion 50 begins a series of operations for shooting processing (shooting control) from reading a signal from the image pickup portion 22 to writing image data into the storage medium 200.

A power supply control portion 80 includes a battery detecting circuit, DC-DC converter, switching circuit that switches an energized block, and the like, and detects whether a battery is attached or not, the type of the battery, and the remaining power of the battery. The power supply control portion 80 controls the DC-DC converter based on the detection results and an instruction from the system control portion 50 and supplies a necessary voltage to portions, including the storage medium 200, for a necessary period. The power supply switch 72 receives switching between power-on and power-off and controls the power supply in the digital camera 100 based on the switching to power-on or power-off received in the power supply switch 72.

Examples of a power supply portion 30 may include a primary battery, such as an alkaline battery or lithium battery, a secondary battery, such as a NiCd battery, NiMH battery, or lithium battery, and an AC adapter. A storage medium interface (I/F) 18 is an interface to the storage medium 200, for example, a memory card or hard disk. The storage medium 200 is a storage medium for storing picked-up image, such as a memory card, and may include a semiconductor memory, optical disk, magnetic disk, or the like.

The operating portion 70 includes a touch panel capable of sensing contact with the display portion 28 as one example element. The touch panel and the display portion 28 can be integral with each other. For example, the touch panel may be formed such that its light transmittance is set so as not to hinder displaying in the display portion 28 and may be attached to the upper layer of the display surface of the display portion 28. Input coordinates in the touch panel and display coordinates in the display portion 28 are associated with each other. This enables a graphical user interface (GUI) that allows a user to feel that they can directly operate a screen displayed on the display portion 28. The system control portion 50 can detect operations on the touch panel or states described below.

- A new touch on a touch panel by a finger or pen that has not touch the touch panel. That is, a start of touching (hereinafter referred to as "touch-down").
- A state where a finger or pen is touching the touch panel (hereinafter referred to as "touch-on").
- A movement in which a finger or pen is moving while touching the touch panel (hereinafter referred to as "touch-move").
- A release of a finger or pen from the touch panel. That is, an end of touching (hereinafter referred to as "touch-up").
- A state where nothing is touching the touch panel (hereinafter referred to as "touch-off").

When touch-down is detected, touch-on is also detected simultaneously. If no touch-up is detected after the touch-down, touch-on is continuously detected in general. Touch-move is detected in the state where touch-on is being detected. Even when touch-on is detected, if a touched position is not moved, no touch-move is detected. After touch-up of all of one or more fingers or pen from the touch panel is detected, the state is touch-off. When touch-down on the touch panel, some touch-move thereon, and then touch-up therefrom are detected, this event can be regarded as a stroke. An operation of quickly providing a stroke is referred to as a flick. The flick is typically an operation of quickly moving a finger by a certain distance while touching the surface of the touch panel and then releasing without any other movements, in other words, an operation of quickly moving a finger along the surface of the touch panel, like a flick of the finger thereon. When touch-move by a predetermined distance or more with a predetermined speed or more is detected and then touch-up without any other movements is detected, it can be detected that a flick has occurred. When the user performs a flick operation in a state where a plurality of display icons are displayed, a display icon in a position that is not adjacent to and is remote from a currently selected (or displayed) display icon can be selected (or displayed). The flick operation can enable selecting an item in a remote position or displaying an area that has not been displayed without having to repeat the same operation.

These operations, states, and coordinates of a position where a finger or pen is touching the surface of the touch panel are informed to the system control portion 50 through an internal bus. The system control portion 50 determines which operation has been performed on the touch panel based on the provided information. For the touch-move, a direction in which a finger or pen is moving on the touch panel can also be determined based on changes in position coordinates for each vertical component and horizontal component on the touch panel. The touch panel can be of any of various types, including the resistive type, capacitive type, surface acoustic wave type, infrared type, electromagnetic induction type, image recognition type, and optical sensor type. These types may be classified into the type of detecting a touch in response to contact with the touch panel and the type of detecting a touch even when a finger or pen is close to the touch panel but does not touch it, and both types can be used as the touch panel.

In FUNC customize setting (hereinafter referred to as function display setting), among functions displayed in the display portion 28 in a shooting standby state, a function to be displayed in a custom display area can be selected, and a position where it is to be displayed can be specified. Depending on the selection on the FUNC button, which is a touch button, a plurality of functions capable of receiving the settings for shooting are displayed in display areas in two rows of the right and left sides in the display portion 28 (function display). In this function display, the function display area on the side of the grip portion 202 in the display portion 28 (on the side of the shutter button 61, which provides a shooting instruction) is the custom display area. As illustrated in FIGS. 1A and 1B, the shutter button 61 is included in the grip portion 202. In the present embodiment, the grip portion 202 is arranged on the right side to the display portion 28 (when the bottom surface is on the lower side) with respect to the main body portion 203 when seen from a person who performs shooting). When the user places a finger (index finger) over the shutter button 61 while gripping the grip portion 202 (mainly with middle, ring, and little fingers of their right hand, in the present embodiment), they can promptly provide a shooting instruction at desired timing with ease and this leads to a reduced loss of shooting opportunities. At this time, because the other hand (left hand in the present embodiment) firmly holds the digital camera 100 so as not to move the position of the portion of the image pickup lens 103 and the position of the main body portion 203, moving the hands to perform operations for the settings is not useful. In the state where the user holds the digital camera 100 with both hands and aims it, their finger can more easily reach a part in the display portion 28 near the grip portion 202 and thus they can more easily operate it in that part. To specify the settings by an operation on the touch panel 70a in the display portion 28, functions are displayed such that the user can change the settings by quickly touching the part in the display portion 28 near the grip portion 202 with the thumb of the hand gripping the grip portion 202. Accordingly, when operations or the like, in particular, during shooting are performed with the hand on the side of the grip portion 202, the digital camera 100 is firmly held and thus the usability for the settings and the like is improved. The functions capable of receiving the settings for shooting can be classified into functions with a high possibility that the settings are not frequently changed under the same shooting environment or within a predetermined period in shooting mode, in the state where self-timer is activated, or in other cases and functions with a high possibility that the settings are frequently changed during shooting (changed for each shooting for still images) to have desired images.

In shooting, the user changes the settings while watching an environment where shooting is performed, a live view, or a rec review. Thus, items that may be changed while the user is shooting are displayed in the custom display area, which is near the grip portion 202, to facilitate changing the settings.

In the function display setting, as a function displayed in the custom display area, the settings are specified such that, among the plurality of functions (item group) that allow the settings to be changed during recording movie in movie shooting or during taking images in still-image shooting, a user's desired function is displayed in a desired position in the custom display area. By carrying out the function display setting, a function frequently used by the user can be displayed in a position where they can operate it easily, an infrequently used function can be hidden, and this leads to increased usability. On the function selection screen, the number of items (positions) that can be set so as to display functions is ten at the maximum, and in this case, they are displayed on two pages such that five items are displayed for one page. A function to be displayed can be set for each item (can be laid out), and one (the same) function can be displayed for two or more items (positions).

Generally, a display item that indicates the settings, a function, or the like in the display portion 28 during the shooting standby state other than a live view image may preferably have a smaller size, and shooting is frequently performed such that a main object is around the center of the live view image. Accordingly, a display item indicating a function may preferably be displayed on an end of the display portion 28. Accordingly, to display settable functions, because the viewability of the live view image is decreased unless they are displayed in a limited area, they are displayed on the right and left ends of the display portion 28. That is, the custom display area and a mode-specific display area are arranged on opposite sides of the central portion of the live view image.

In the present embodiment, a button, item, and function are selected in response to a touching operation. They may not be selected by a touching operation and may also be selected by a press of the D-pad 82 or SET button 83. In selection by using the D-pad 82, the selection is moved from the currently selected item to an item in a position corresponding to the direction of the pressed up, down, left, or right keys (82a, 82b, 82d, 82c) in the D-pad key 82.

Figure 3:
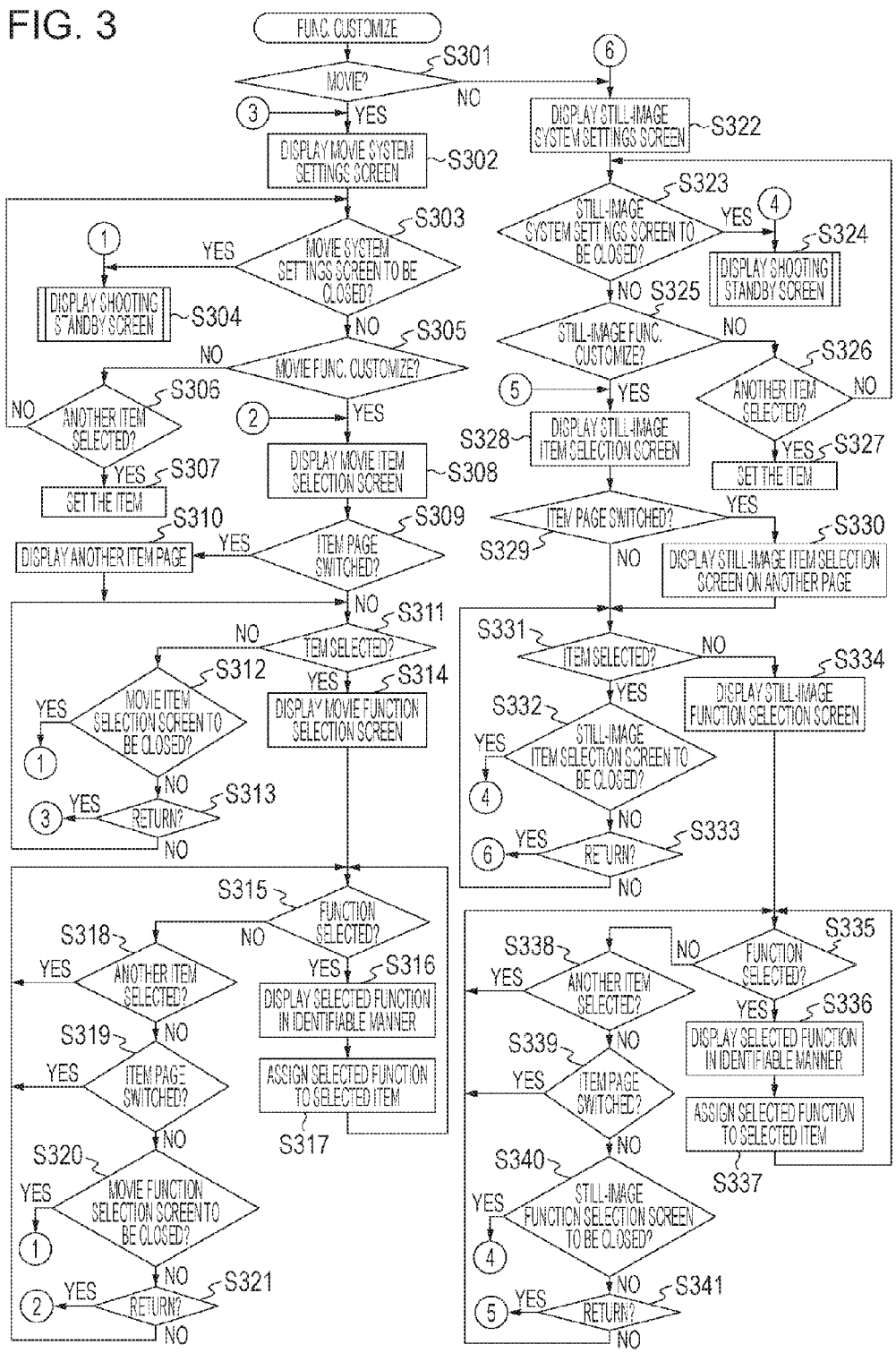
FIG. 3 is a flowchart that illustrates FUNC customize processing according to the present embodiment.

Processing for FUNC customize setting (lay out setting) is described with reference to FIG. 3. This flow starts in response to selection of the FUNC button on the standby screen for movies or still images. This processing is achieved by developing a program stored in the nonvolatile memory 56 in the system memory 52 and executing it by the system control portion 50.

At S301, the system control portion 50 determines whether the current mode is the movie shooting mode. If it determines that the current mode is the movie shooting mode, the processing proceeds to S302. If not so, the processing proceeds to S322.

Figure 4A:
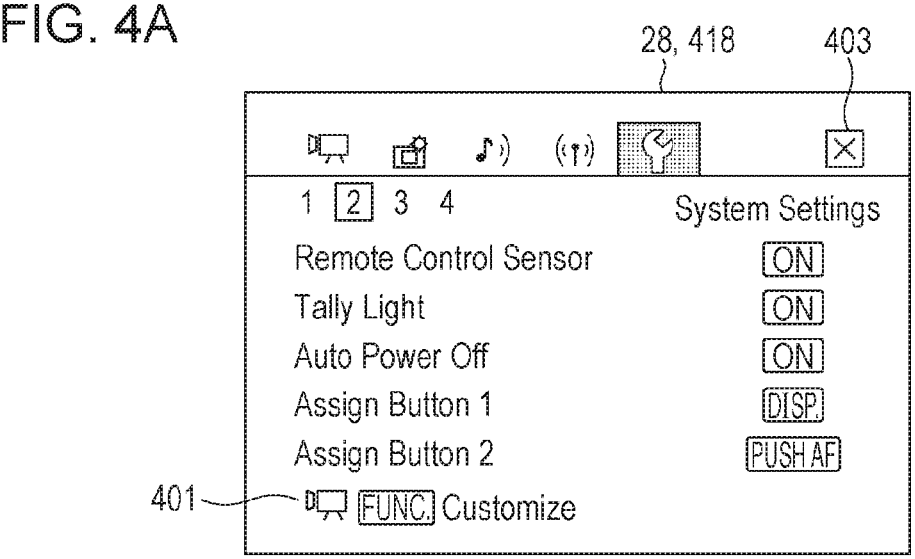
FIGS. 4A and 4B (4B-1 and 4B-2) includes illustrations of example settings screens in the present embodiment.

At S302, the system control portion 50 displays a movie system settings screen in the display portion 28. FIG. 4A illustrates a display example of the system settings screen for movies, and FIGS. 4B (4B-1 and 4B-2) illustrates a display example of an item selection screen for movies. As illustrated in FIG. 4A, the settings of the movie FUNC customize, tally light, auto power off, and the like can be specified on a movie system settings screen 418. A setting name 401 indicates the movie FUNC customize.

At S303, the system control portion 50 determines whether an instruction to close the movie system settings screen 418 has been provided. In the case where a close button 403 is displayed on the movie system settings screen 418 and it is determined that the close button 403 is selected, the processing proceeds to S304 and moves to the flow for the shooting standby screen. If not so, the processing proceeds to S305.

At S304, the processing for displaying the shooting standby screen and for specifying the settings of functions is performed. The shooting standby screen is described with reference to FIG. 6.

At S305, the system control portion 50 determines whether the movie FUNC customize has been selected from among the setting names displayed on the movie system settings screen 418. If it determines that the movie FUNC customize (setting name 401) has been selected, the processing proceeds to S308. If not so, the processing proceeds to S306.

At S306, the system control portion 50 determines whether a setting name other than the movie FUNC customize has been selected from among the setting names displayed on the movie system settings screen 418. If it determines that the other setting name has been selected, the processing proceeds to S307. If not so, the processing proceeds to S303.

At S307, the system control portion 50 specifies the settings for another setting name. For example, if the auto power off is selected, the user can set the power at either ON or OFF. The settings for other setting names are not described here. After specifying the settings for the other setting name, subsequently the settings for still another setting name may be specified, or the state may return to the shooting standby screen when the close button 403 is selected.

Figures 1, 4B:
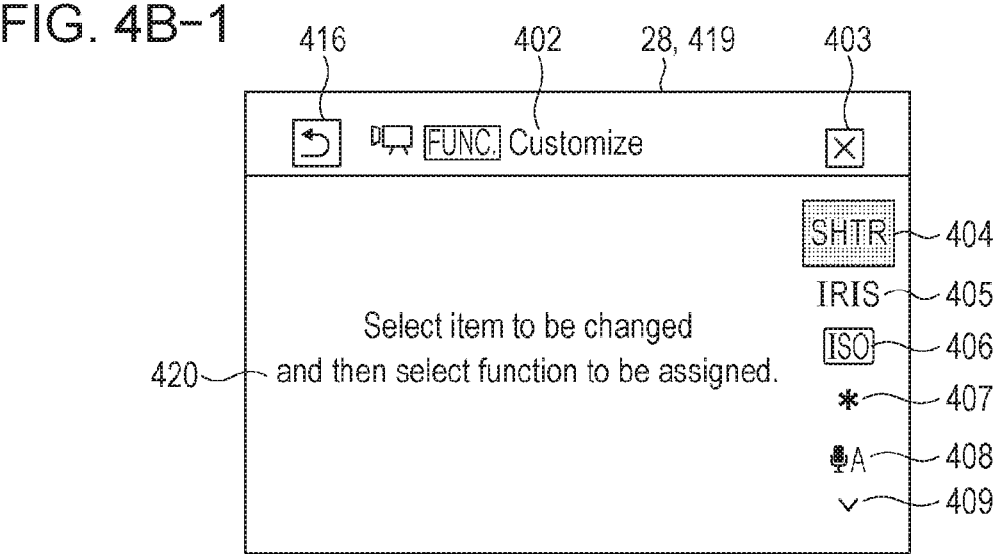
Figures 2, 4B:
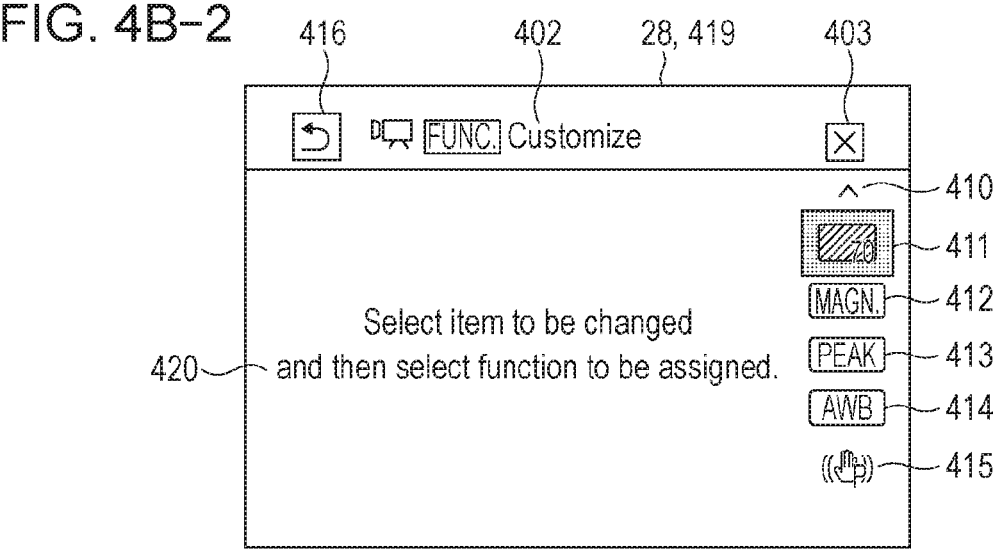

At S308, the system control portion 50 displays a movie item selection screen in the display portion 28. FIG. 4B-1 illustrates items 404 to 408 currently selectable from among the ten items displayed on a movie item selection screen 419. The ten items indicate positions where the functions are displayed. In response to selection of a scroll down button 409 in the state illustrated in FIG. 4B-1, currently hidden items (another item page) appear. In this way, the user can specify the settings of a function can be displayed in any of the ten positions over two pages. In FIGS. 4B (4B-1 and 4B-2), the functions displayed in the items (404 to 408, 411 to 415) are the ones in the case where displayed functions are tentatively set for the items. The movie item selection screen 419 is merely an example. The items may not be assigned functions.

A setting name 402 indicating a screen on which the movie FUNC customize (movie function display setting) is specified and a description 420 about how to specify the FUNC customize setting are displayed on the movie item selection screen 419. This makes the user recognize that the screen is a setting screen for carrying out the function display setting for movie shooting and know how to specify the settings.

At S309, the system control portion 50 determines whether an item page has been switched. Here, the system control portion 50 determines whether, of the scroll down button 409 and a scroll up button 410 illustrated in FIGS. 4B (4B-1 and 4B-2), a currently displayed scroll button has been selected. If the system control portion 50 determines that the item page has been switched, the processing proceeds to S310. If not so, the processing proceeds to S311. As previously described, the settable items are displayed such that five items are displayed for each of two pages, and in response to selection of the scroll down button 409 or scroll up button 410, as described above, the item page is switched. The item page can also be switched by a flick operation.

At S310, the system control portion 50 displays an item page different from the currently displayed item page in the display portion 28.

At S311, the system control portion 50 determines whether an item has been selected. When the screen illustrated in FIG. 4B-1 (first page) is displayed, the system control portion 50 determines whether any one of the items 404 to 408 has been selected. When the screen illustrated in FIG. 4B-2 (second page) is displayed, it determines whether any one of the items 411 to 415 has been selected. An item can be selected by a touching operation on the item (area where the item is displayed). If the system control portion 50 determines that the item has been selected, the processing proceeds to S314. If not so, the processing proceeds to S312.

At S312, the system control portion 50 determines whether the movie item selection screen is to be closed. It determines whether the close button 403 on the movie item selection screen 419 has been selected. In response to the selection, the screen for carrying out the movie function display setting, as well as the movie item selection screen 419, are closed (hidden), the processing proceeds to the flow for displaying the shooting standby screen at S304.

At S313, the system control portion 50 determines whether the state is to return from the movie item selection screen to the system settings screen. It determines whether a return button 416 on the movie item selection screen 419 has been selected. In response to the selection, the original movie system settings screen 418 is displayed in the display portion 28. As described at S312 and S313, when the close button 403 is selected, regardless of the currently displayed screen, the screen for carrying out the movie function display setting is hidden; when the return button 416 is selected, the immediately preceding screen (in the previous layer) is displayed in the display portion 28.

Figure 5A:
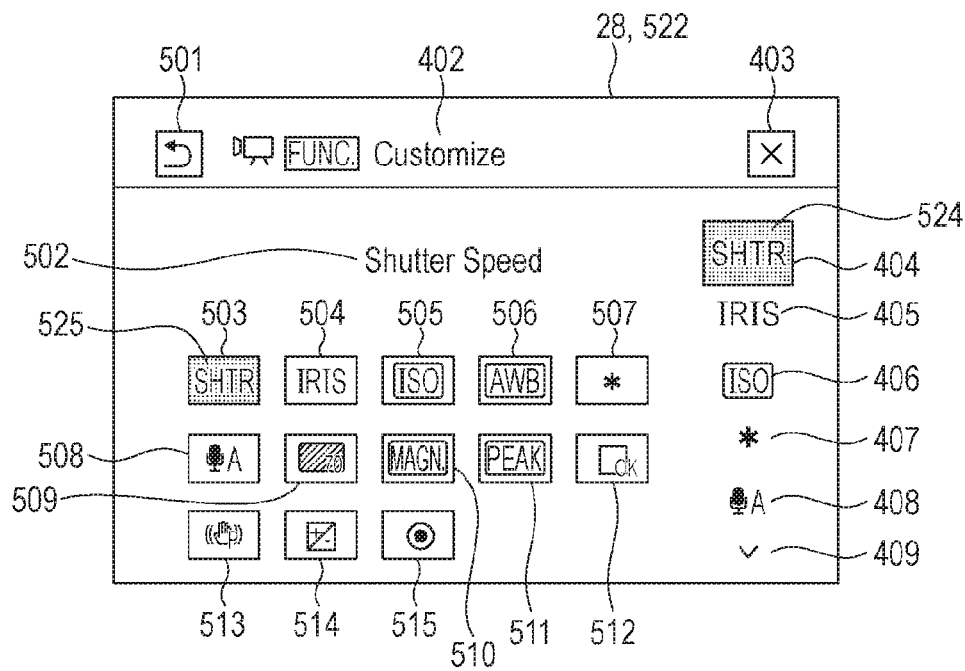
FIGS. 5A and 5B includes illustrations of example settings screens for items in the present embodiment.
Figure 5B:
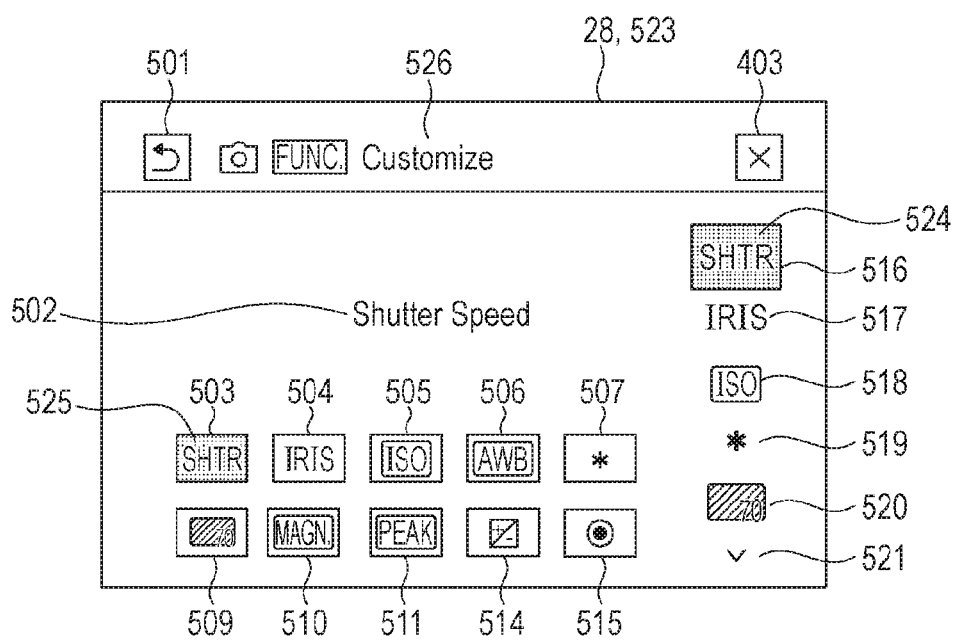

If it is determined at S311 that the item has been selected, the system control portion 50 displays the movie function selection screen in the display portion 28. FIGS. 5A and 5B includes illustrations of function selection screens. FIG. 5A illustrates a movie function selection screen, and FIG. 5B illustrates a still-image function selection screen. The items 404 to 408 and functions 503 to 515 settable for the items are displayed on a movie function selection screen 522 illustrated in FIG. 5A. As in the item 404, the currently selected item is displayed in a color display manner different from the other items (portion of the characters is hollow, the other portions are grayed), as illustrated in an identifiable indication 524.

At S315, the system control portion 50 determines whether a function to be assigned to the currently selected item has been selected. If it determines that the function has been selected, the processing proceeds to S316. If not so, the processing proceeds to S318.

The functions 503 to 515 on the movie function selection screen 522 are functions that can be assigned to items as the movie function display setting. The function 503 indicates a shutter speed, the function 504 indicates an iris, the function 505 indicates an ISO speed, the function 506 indicates white balance, and the function 507 indicates EXP lock, which is the function of being able to fix a currently exposure level. The function 508 indicates the function of setting a microphone level, the function 509 indicates the function of setting displaying of a zebra pattern, the function 510 indicates the function of setting magnification of a displayed live view image, and the function 511 indicates the function of setting displaying of peaking. The function 512 indicates the function of setting digital teleconversion, the function 513 indicates the function of setting powered IS, the function 514 indicates the function of setting an AE shift amount, and the function 515 indicates the function of setting a touch focus. The settings of these functions can be changed during movie shooting. The items can be selected by a touching operation. When a function is selected, that function is assigned to the currently selected item (position) indicated by the identifiable indication 524. In this way, the settings can be specified such that the user can enable a desired function to be displayed in a desired position by selecting a position where a function is to be displayed and then selecting the function to be displayed.

At S316, the system control portion 50 displays the function selected at S315 in an identifiable manner. A function name or description of the currently selected function is indicated in a function description 502. FIG. 5A illustrates a display example when the function 503 is selected. The function 503 on the movie function selection screen 522 is indicated in a display manner of an identifiable indication 525 with a color different from the other functions.

At S317, the system control portion 50 assigns the function selected at S315 to the currently selected item. In the example illustrated in FIG. 5A, because the item 404 and the function 503 are selected, the shutter speed of the function 503 is assigned to the item 404. In the state of the movie function selection screen 522 in FIG. 5A, because the item 404 is selected, the display item of the shutter speed indicating the selected function 503 is also displayed in the item 404. When another function is selected, the display item displayed in the item 404 is also switched.

Here, a case where a function is assigned to an item by an operation on the D-pad 82 is described. After an item is selected on the item selection screen and then the screen transitions to the function selection screen, the function currently assigned to the selected item is selected. By operating the up, down, right, or left key 82a, 82b, 82c, or 82d, the function to be selected is moved (cursor is moved) from the currently selected function, and the cursor is moved to the currently selected item by a press of the SET button 83. In this way, the selected layer transitions from the layer for selecting a function to that for an item in response to a press of the SET button 83 on the function selection screen.

At S318, the system control portion 50 determines whether another item (any one of the items 405 to 408 and 411 to 415) has been selected on the movie function selection screen 522. If it determines that the other item has been selected, the processing returns to S315, and the function to be assigned to the selected item is selected. If not so, the processing proceeds to S319.

At S319, the system control portion 50 determines whether, of the scroll down button 409 and the scroll up button 410, a currently displayed scroll button has been selected on the movie function selection screen 522. If it determines that the item page has been switched, the processing proceeds to S315. If not so, the processing proceeds to S320.

At S320, the system control portion 50 determines whether the movie function selection screen is to be closed. In response to selection of the close button 403 on the movie function selection screen 522, the screen for carrying out the movie function display setting, as well as the function selection screen 522, are closed (hidden), the processing proceeds to the flow for displaying the shooting standby screen at S304.

At S321, the system control portion 50 determines whether the state is to return from the movie function selection screen to the item selection screen. In response to selection of a return button 501 on the movie function selection screen 522, the state returns to the original item selection screen 419. As described at S320 and S321, when the close button 403 is selected, regardless of the currently displayed screen, the screen for carrying out the movie function display setting is hidden; when the return button 501 is selected, the immediately preceding movie item selection screen 419 is displayed in the display portion 28.

S302 to S321 are the flow for the function display setting for movies, whereas S322 to S341 are the flow for the function display setting for still images. The content of the function display setting for movies and that for still images are separately stored in the system memory 52. The function display set is displayed during shooting according to the mode. The functions settable during shooting vary by the mode, and thus selectable functions partly vary. The function display setting for still images and the function display setting for movies are carried out in substantially the same operation procedure. The differences between them are described below. At S302 to S321, the movie system settings screen 418, the movie item selection screen 419, and the movie function selection screen 522 are described. For still images, corresponding screens for still images are displayed in the display portion 28. Unlike the movie case, the display item indicating the FUNC customize for still images of an item name 526 in FIG. 5B is displayed in the location of the setting name 401. The display item indicating the FUNC customize for still images, as indicated as the item name 526, is displayed on a still-image item selection screen 523. Unlike the movie case, the functions 503 to 507, 509 to 511, 514, and 515 that can be assigned to the items in the still-image function setting are displayed on the still-image item selection screen 523 in FIG. 5B. The function 508 (microphone level), function 512 (digital teleconversion), function 513 (powered IS), which can be assigned in the movie case, cannot be assigned in the still-image case. The settable functions displayed in the custom display area in the still-image case are different from those in movie case, and the functions can be assigned to the items 516 to 520 and items on an item page appearing in response to selection of a scroll down button 521. As described above, the functions displayed in the custom display area in the still-image case and those for the movie case can be separately specified.

Because the user can select a function to be displayed in the custom display area and can also set a position where it is to be displayed, they can enable a frequently used function to be displayed in a position where it can be easily operated. In setting operation, the user does not have to further select a function to be displayed after they determine functions whose settings may be changed during shooting, and they are only required to select a function from among already displayed functions. In addition, because the functions separately specified for the still-image case and the movie case are displayed, functions that are used in one shooting mode but not used in the other shooting mode are not displayed in the other shooting mode, so such functions do not occupy space in a limited area.

The function display is described with reference to FIGS. 8A-8E.

Figures 8A, 8B, 8C, 8D, 8E:
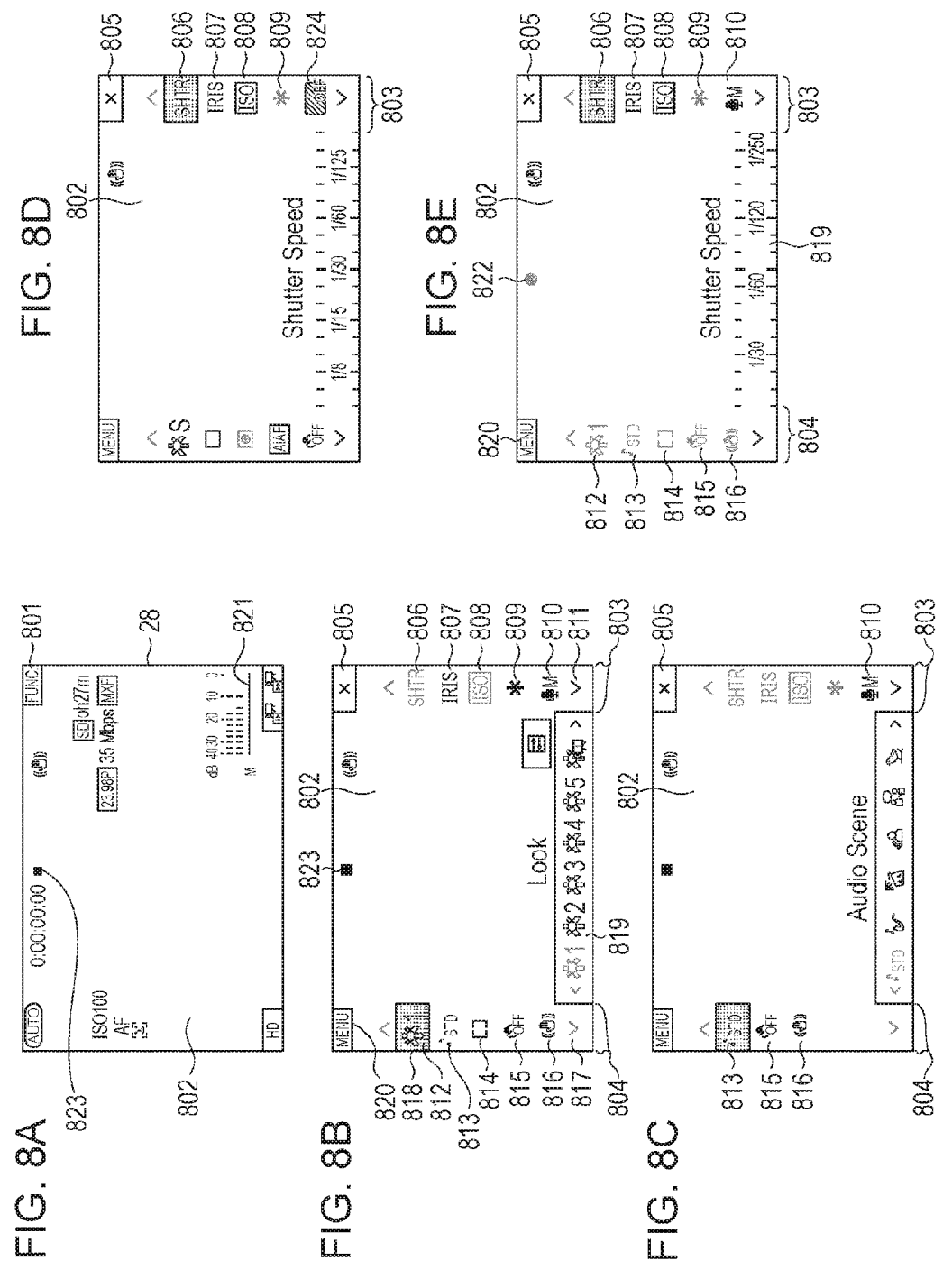

FIGS. 8A-8E includes illustrations of example shooting standby screens and an example display during shooting. FIG. 8A illustrates an example of the movie shooting standby screen when the function display is not carried out. FIG. 8B illustrates an example of the shooting standby screen when an AV mode in HD movie shooting is set, FIG. 8C illustrates an example of the shooting standby screen when an AUTO mode in 4K movie shooting is set, FIG. 8D illustrates an example of the shooting standby screen when an M mode in still-image shooting is set, and FIG. 8E illustrates an example of a screen when the M mode in 4K movie shooting is set. In FIGS. 8A-8E, for the sake of simplification, a live view image 802 is assumed to be obtained by shooting a movie of a black surface.

A custom display area 803 illustrated in FIGS. 8B to 8E is displayed in an area adjacent to the grip portion 202. A mode-specific display area 804 is displayed in an area in the display portion 28 that is more remote from the grip portion 202 than the custom display area 803. Functions set in the FUNC customize in FIG. 3 are displayed in the custom display area 803. Functions corresponding to each mode are displayed in the mode-specific display area 804. The functions displayed in the custom display area 803 allow their settings to be changed during movie shooting or in shooting still images, and the user can quickly change the settings of the functions in a shooting standby state. The functions displayed in the mode-specific display area 804 allow their settings to be changed in each shooting mode, and the functions whose settings cannot be changed are not displayed therein. Accordingly, the position where a function is displayed varies by the mode, and the number of functions displayed varies by the mode. The functions displayed in the mode-specific display area vary depending on, in addition to the still-image mode or the movie mode, the storage form and the image quality. In movie mode, the functions whose settings are changed not during movie shooting but before or after shooting are displayed in the mode-specific display area. The settings of the functions displayed in the mode-specific display area cannot be changed by a touching operation in the state where the user aims the digital camera 100 while gripping the grip portion 202 because a finger (thumb) cannot reach the mode-specific display area. To touch a function displayed in the mode-specific display area, it is necessary for the user to remove their right hand from the grip portion 202 (that is, remove the finger from the shutter button 61) in the state where the user holds the lens portion in their left hand and keeps hold of the digital camera 100 and to touch it with the finger of the right hand. However, during movie shooting, which is a state where the digital camera 100 is not stably held or a state where the user cannot quickly provide a shooting instruction, because an obtained image may undergo blur or a shooting opportunity may slip away, such a state is not useful. Accordingly, to enable the user to change the settings during movie shooting without being brought into such a state, the functions whose settings can be changed during movie shooting are displayed in not the mode-specific display area but the custom display area. Meanwhile, it is useful to display even the functions whose functions cannot be changed during shooting or the set items (set values) of such functions. Thus, the display items indicating the functions whose settings cannot be changed during movie shooting or the set items (set values) of such functions are displayed in the mode-specific display area. This enables the user to perform shooting while checking the content of the settings.

As described above, the functions specified in the FUNC customize for still images are displayed in the custom display area 803 in the still-image shooting mode, whereas the functions specified in the FUNC customize for movies are displayed in the custom display area 803 in the movie shooting mode. The settings of the functions are changed in a setting area 819 in both modes. Here, the display items indicating the displayed functions are display items indicating parameters during setting in the functions (set items specified in the setting area 819).

Next, the flow for displaying the shooting standby screen is described with reference to FIG. 6. This flow illustrates the details of the processing occurring when the shooting mode is switched, when the system settings screen is closed at S303 or S323 in FIG. 3, when the item selection screen is closed at S312 or S332, or when the function selection screen is closed at S320 or S340. This processing is achieved by developing a program stored in the nonvolatile memory 56 in the system memory 52 and executing it by the system control portion 50.

At S601, the system control portion 50 determines whether the current shooting mode is the movie shooting mode. If it determines that the current shooting mode is the movie shooting mode, the processing proceeds to S602. If not so, the processing proceeds to S642.

At S602, the system control portion 50 determines whether the shooting mode has been switched. If it determines that the shooting mode has been switched, the processing returns to S601. If not so, the processing proceeds to S603. When an instruction to activate the function display is provided during displaying the shooting standby screen, the function display corresponding to the selected shooting mode is carried out.

At S603, the system control portion 50 determines whether the shooting mode has finished. If it determines that the shooting mode has finished, displaying the shooting standby screen ends. If not so, the processing proceeds to S604. The finish of the shooting mode includes turning-off of the power supply or switching to a play-back screen.

At S604, the system control portion 50 displays the movie shooting standby screen in the display portion 28. FIGS. 8A to 8C illustrate examples of the display portion 28 in the movie shooting standby state. FIG. 8A illustrates a case where the function display is not carried out. FIGS. 8B and 8C illustrate cases where the function display is carried out. At S604, as illustrated in FIG. 8A, the function display is not carried out, and the live view image 802 obtained from the image pickup portion 22 is displayed. In addition, icons indicating the shooting mode shooting settings, including a FUNC button 801, a microphone level indicator 821 indicting the microphone level, and a standby icon 823 indicating the standby state for movie shooting, are displayed. The FUNC button 801 is near the grip portion 202, thus allowing the user to select it by a touching operation while aiming the digital camera 100. When the function display is not carried out, amongf the icons indicating the functions displayed in the display portion 28, a function whose settings has been changed from a predetermined set value or set item is displayed as a display item indicating the changed set value or set item.

At S605, the system control portion 50 determines whether the FUNC button has been selected (touched). The FUNC button 801 illustrated in FIG. 8A is displayed so as to be superimposed on the live view image 802 when the function display is not carried out. In response to selection of the FUNC button 801, it is hidden from the display portion 28. If the system control portion 50 determines that the FUNC button has been selected, the processing proceeds to S606. If not so, the processing proceeds to S619.

At S606, the system control portion 50 determines which functions are to be displayed in the mode-specific display area. FIG. 9 illustrates shooting modes and functions displayed in the mode-specific display area 804 in each shooting mode. The shooting mode includes three kinds of shooting methods, which are 4K movie shooting, HD movie shooting, and still-image shooting, and automatic (AUTO), program (P), shutter priority (TV), manual (M), and scene (SCN) modes. When the movie mode (4K movie shooting or HD movie shooting) is selected, a mode can be further selected in the selected movie mode (movie mode switching). The functions displayed in the mode-specific display area 804 can be divided into nine display patterns in total in shooting modes obtained by multiplying the shooting modes and the modes. As illustrated in FIG. 9, depending on the pattern, some functions are displayed, and other functions are not displayed. If the mode is changed (mode is set) to another mode having a pattern different from a pattern corresponding to the previous shooting mode, the functions displayed in the mode-specific display area 804 are changed. For example, in the case where the mode is changed from the AV mode in HD movie shooting to the AUTO mode in 4K shooting, the displayed functions are different, as illustrated in the mode-specific display area 804 in FIGS. 8B and 8C. In FIG. 8B, functions 812 to 816 are displayed, and there is one not-displayed function that is made to be displayed by selection of a scroll down button 817. In FIG. 8C, the functions 813, 815, and 816 are displayed. In the mode-specific display area 804, depending on the shooting mode, the functions whose settings can be changed in each mode are collectively (in sequence from the upper section), and the functions whose settings cannot be changed are not displayed (are hidden). Accordingly, because the functions whose settings can be changed are displayed and the functions whose settings cannot be changed are not displayed in the mode-specific display area 804, a desired function can be quickly selected from among narrowed options. The functions displayed in the mode-specific display area 804 are the functions whose settings cannot be changed during shooting, but are the functions whose setting are allowed to be quickly changed after the preceding shooting. Thus, next shooting can be started immediately.

At S607, the system control portion 50 determines which functions are to be grayed out in the set functions displayed in the custom display area. FIG. 10 illustrates functions settable in the FUNC customize in FIG. 3 and shooting modes or settings in shooting in which functions are grayed out. The microphone level, powered IS, and digital teleconversion are the functions that can be selected only in the movie case, and in the still-image case, they cannot be selected in the FUNC customize and are not displayed. For example, in the case where the mode is changed from the AV mode in HD movie shooting to the AUTO mode in 4K shooting, the grayed-out functions are different, as illustrated in the custom display area 803 in FIGS. 8B and 8C. In FIG. 8B, of functions 806 to 810, the functions 806 and 808 are grayed out. In FIG. 8C, the functions 806 to 809 are grayed out. In FIG. 8B, the functions 807, 809, and 810 are displayed in a normal manner (displayed in a white manner in FIGS. 8A-8E). In FIG. 8C, the function 810 is displayed in a normal manner. Unlike in the mode-specific display area 804, the positions where the set functions are displayed are the same through the shooting modes in the custom display area 803, and the functions whose settings cannot be changed are grayed out depending on the shooting mode or settings. The custom display area 803 is the area in which the user sets the displayed functions and the displayed positions of the functions, and the displayed positions are not changed depending on the mode or settings. Thus, the user can more intuitively operate it in any mode or settings.

At S608, the system control portion 50 carries out the function display. The functions determined at S606 to be to be displayed are displayed in the mode-specific display area 804, the functions determined at S607 to be to be displayed in a graying-out manner are displayed in the custom display area 803, and other functions are displayed in a normal manner. When the function display is carried out, the display items displayed in the original shooting standby screen can be divided into a display item that will remain displayed, a display item that will be displayed in a different manner, and an item that will not be displayed. The standby icon 823, which indicates the movie shooting standby state, remains displayed. The microphone level indicator 821, which indicates the microphone level, is displayed as the function 810, which indicates the function of the microphone level. The FUNC button 801 is hidden. When the function display is not carried out, only a function whose settings have been changed from the predetermined settings or a part of functions is displayed in the display portion 28, and in the function display, regardless of the settings of the functions, these functions are displayed. The details of the settings of a function can be checked by selection of a display item indicating the function.

At S609, the system control portion 50 displays the currently selected function in an identifiable manner from among the displayed functions. In FIG. 8B, the function 812 is currently selected, and the function 812 is displayed in a display manner of an identifiable indication 818 (with a different color). In an initial state where the user provides no instruction to select a function, the top function in the custom display area 803 (function displayed in the position where the function 806 is displayed in FIGS. 8B and 8C) is displayed in the display manner of the identifiable indication 818.

At S610, the system control portion 50 displays parameters or settable items of the currently selected function in the setting area 819 as an area for use in changing the settings of the currently selected function. In FIG. 8B, settable items are displayed in the setting area 819 as the currently selected function 812 (look function).

The items displayed in the setting area 819 are also changed in response to selection of another function. For example, in FIG. 8C, an audio scene of the function 813 is selected, and selectable items in the audio scene are displayed in the setting area 819. Because the standard is currently specified, the audio scene (function 813) in the mode-specific display area 804 is indicated by the display item indicating the standard.

At S611, the system control portion 50 determines whether the settings of the currently selected function have been changed by a selecting operation on the setting area 819. The selecting operation can be a touching operation on a settable item or set value displayed in the setting area 819. In the selecting operation on the setting area 819, because in the state where the user grips the grip portion 202 and aims the digital camera 100, the thumb of the hand gripping the grip portion 202 reaches that area, the settings of the currently set function can be changed. The settings of the currently set function can also be changed by an operation on the D-pad 82. To select the function whose settings are to be changed by using the D-pad 82, after the cursor is positioned in the function whose settings are to be changed by using the D-pad 82, the SET button 83 is pressed to confirm the function whose functions are to be changed. In response to the press of the SET button 83, the cursor is positioned in the position indicating the currently set value or display icon indicating the settable item, among the items displayed in the setting area 819. In the setting area 819, the settings can be changed in response to an operation on the right or left key 82*c* or 82*d*. In the state where a display icon displayed in the setting area 819 is selected, when an operation is performed on the up or down key 82*a* or 82*b*, the cursor is moved to the currently selected function (currently selected function is selected, the state is moved to a layer for selecting the function). If the system control portion 50 determines that the settings have been changed, the processing proceeds to S612. If not so, the processing proceeds to S613.

At S612, the system control portion 50 sets the settings of the currently selected function at the set item or set value of the function whose settings are changed at S611. At this time, the icon indicating the function in which the display item indicating that function in the mode-specific display area 804 or the custom display area 803 is indicated by the currently set item is also changed to the display item indicating the set item set at S612.

At S613, the system control portion 50 determines whether another function has been selected from the currently selected function. The function can be selected by touching on a displayed function. Because the thumb of the hand gripping the grip portion 202 can reach the custom display area in the state where they grip the grip portion 202 and aims the digital camera 100, they can select a function while aiming the digital camera 100. The function can also be selected by moving the cursor by using the up or down key 82*a* or 82*b* in the D-pad 82. If the system control portion 50 determines that another function has been selected, the processing proceeds to S614. If not so, the processing proceeds to S609. The settings of functions displayed in the mode-specific display area 804 and the custom display area 803 can be changed by repeating S611 to S614, and this enable the user to perform shooting under the desired settings. A case where the user selects the function by using the D-pad 82 is described below. In the present embodiment, the functions displayed in the mode-specific display area and those in the custom display area are separately arranged in a vertical manner. By an operation on the left or right key, the selection can be moved from the function displayed in the mode-specific display area to the function displayed in the custom display area. By an operation on the up or down key, the selection can be moved between the function displayed in each of the display areas and a menu icon 820 or a close icon 805. When a function displayed on an end is selected among the displayed functions, if the function is on the upper end and another item page exists above or if the function is on the lower end and another page exists below, the item page can be switched in response to an operation on the up key 82a or down key 82i b.

At S614, the system control portion 50 determines whether the menu icon has been selected. In response to selection of the menu icon 820 illustrated in FIG. 8B to 8D (or menu button 84), the menu setting, including the FUNC customize setting, can be performed. If the system control portion 50 determines that the menu icon has been selected, the processing proceeds to S615. If not so, the processing proceeds to S616.

At S615, the system control portion 50 performs the FUNC customize setting processing described with reference to FIG. 3.

At S616, the system control portion 50 determines whether a shooting instruction has been provided. If it determines that the shooting instruction (shooting instruction operation) has been provided, the processing proceeds to S626. If not so, the processing proceeds to S617. The shooting instruction can be provided by pressing the shutter button 61 all the way down.

At S617, the system control portion 50 determines whether the function display is to be closed (hidden). If it determines that the function display is to be closed, the processing proceeds to S618. If not so, the processing proceeds to S638. The function display is hidden in response to selection of the close icon 805.

At S618, the system control portion 50 hides the function display in the display portion 28, and the processing returns to S602.

At S619, the system control portion 50 determines whether the shooting instruction has been provided. If it determines that the shooting instruction has been provided, the processing proceeds to S620. If not so, the processing returns to S602.

At S620, the system control portion 50 performs the movie shooting processing. When the shooting instruction is provided at S619 and the movie shooting starts, the processing for the currently shooting movie is performed. Here, at S620, because the shooting starts without selecting the FUNC button 801 at S605, the function display is not carried out in the display portion 28.

At S621, the system control portion 50 determines whether the FUNC button has been pressed, as in S605. If it determines that the FUNC button has been pressed, the processing proceeds to S624. If not so, the processing proceeds to S622.

At S622, the system control portion 50 determines whether an instruction to terminate the shooting has been provided. If it determines that an instruction to terminate the shooting has been provided, the processing proceeds to S623. If not so, the processing returns to S620. The instruction to terminate the shooting is provided by pressing the shutter button 61 all the way down, as in the case of the instruction to start the shooting.

At S623, the system control portion 50 performs shooting termination processing. In the shooting termination processing, the shot movie is compressed, thumbnails are created, and the like, and they are stored with the day and time of the shooting.

The processing of S624 and S625 is the same as that of S606 and S607.

At S626, the system control portion 50 determines which function is to be grayed out during movie shooting among the functions displayed in the mode-specific display area. This processing is performed when the movie shooting starts during the function display for movies (S616) or when an instruction to activate the function display is provided during the movie shooting (S621). FIG. 11 illustrates conditions for graying out functions displayed in the mode-specific display area. As illustrated in FIG. 11, the functions displayed in the mode-specific display area are the functions whose settings cannot be changed (whose changes in settings are disabled) during movie shooting, and thus they are grayed out during the movie shooting. The drive mode is displayed only in the still-image case. The pre REC and self-timer have gray-out conditions other than during the movie shooting.

As illustrated in FIG. 10, the functions displayed in the custom display area are not grayed out in response to a switch to movie shooting (recording), and the settings of the functions displayed in the shooting standby state can also be changed even during the movie shooting.

At S627, the system control portion 50 carries out the function display, as in S608. The system control portion 50 displays the functions determined to be to be displayed at S624 in the mode-specific display area 804, displays the functions determined to be to be grayed out at S625 in the custom display area 803, and displays the other functions in a normal manner. In response to the determination at S626, the functions displayed in the mode-specific display area are grayed out. FIG. 8E illustrates an example of the display portion 28 during shooting when the M mode in 4K movie shooting is set. In FIG. 8E, the functions 812 to 816 displayed in the mode-specific display area 804 are grayed out, and this indicates that their settings cannot be changed. In contrast, as illustrated in FIG. 8E, among the functions displayed in the custom display area 803, the functions displayed in a normal manner before the movie shooting starts are not grayed out even when the movie shooting starts. The functions 806 to 808 and 810 remain displayed in a normal manner. As illustrated in FIG. 10, the EXP lock indicated by the function 809 is a function that is grayed out in M mode, and it is grayed out, regardless of whether the movie is shooting or not. In the case where the functions 812 to 816 displayed in the mode-specific display area 804 in the movie standby state are selected, a description indicating that the settings of the selected function cannot be changed (not illustrated) appears in response to the starting of the movie shooting. The standby icon 823 is hidden, and a shooting icon 822 indicating that the movie is shooting is displayed.

At S628, the system control portion 50 grays out the menu icon 820. During the movie shooting, the FUNC customize cannot be specified and the other items cannot be specified. Thus, the system control portion 50 grays out them and indicates that the settings cannot be changed.

The processing of S629 and S630 is the same as that of S609 and S610.

At S631, the system control portion 50 performs the movie shooting processing, as in S620.

At S632, the system control portion 50 determines whether an instruction to terminate the shooting has been provided, as in S622. If it determines that an instruction to terminate the shooting has been provided, the processing proceeds to S636. If not so, the processing proceeds to S633.

The processing of S633 to S635 is the same as that of S611 to S613.

At S636, the system control portion 50 displays the functions that are displayed in the mode-specific display area 804 and that are grayed out in the function display at S627 and the menu icon 820 in a normal manner.

At S637, the system control portion 50 performs the shooting termination processing, as in S623.

At S638, the system control portion 50 determines whether the shooting mode has finished, as in S603. If it determines that the shooting mode has finished, displaying the shooting standby screen ends. If not so, the processing proceeds to S639.

At S639, the system control portion 50 determines whether the shooting mode has been switched. If it determines that the shooting mode has been switched, the processing proceeds to S640. If not so, the processing returns to S609.

At S640, the system control portion 50 determines whether the current shooting mode is the movie shooting mode. If it determines that the current shooting mode is the movie shooting mode, the processing proceeds to S606. If not so, the processing proceeds to S641.

At S641, the system control portion 50 displays the still-image standby screen. The details of the flow for displaying the still-image standby screen are described below with reference to FIG. 7.

S642 indicates a case where it is determined at S601 that the current mode shooting mode is not the movie mode. The system control portion 50 displays the still-image standby screen, as in S641.

Next, the flow for displaying the still-image standby screen is described with reference to FIG. 7. This processing describes the details of the processing at S642 in FIG. 6. This processing is achieved by developing a program stored in the nonvolatile memory 56 in the system memory 52 and executing it by the system control portion 50.

Figure 6:
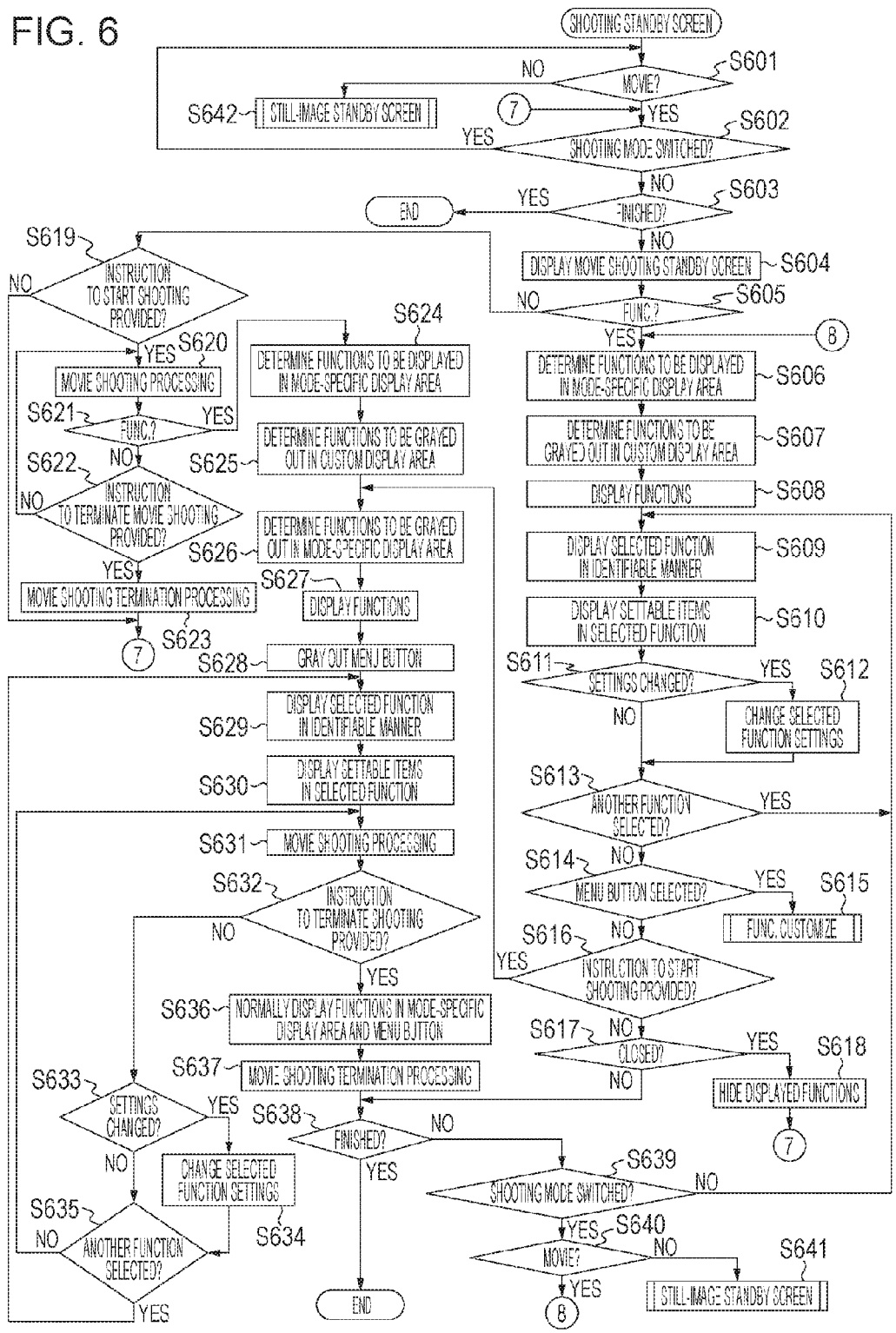
FIG. 6 is a flowchart that illustrates processing for displaying a shooting standby screen according to the present embodiment.

At S701, the system control portion 50 determines whether the current shooting mode is the movie shooting mode, as in S601 in FIG. 6. If it determines that the current shooting mode is the movie shooting mode, the processing proceeds to S726. If not so, the processing proceeds to S702.

The processing of S702 and S703 is the same as that of S602 and S603 in FIG. 6.

At S704, the system control portion 50 displays the still-image standby screen in the display portion 28.

The processing of S705 to S715 is the same as that of S605 to S615 in FIG. 6. It is noted, however, that in the function display at S708, the functions displayed in the custom display area are specified in the FUNC customize (function display setting) for still images, and the functions stored in the system memory 52 as the function display setting for still images are displayed.

At S716, the system control portion 50 determines whether a shooting instruction has been provided. If it determines that a shooting instruction has been provided, the processing proceeds to S719. If not so, the processing proceeds to S717. The shooting instruction can be provided by pressing the shutter button 61 all the way down. Shooting preparation can be made by pressing the shutter button 61 halfway down. The shooting preparation includes operations, such as AF processing, AE processing, AWB processing, and EF processing.

The processing of S717 and S718 is the same as that of S617 and S618 in FIG. 6.

At S719, the system control portion 50 performs still-image shooting processing. Here, images (still images) obtained by the image pickup portion 22 are stored in the storage medium 200.

At S720, the system control portion 50 determines whether the shooting mode has finished. The finish of the shooting mode includes turning-off of the power supply or switching to a play-back screen. If it determines the shooting mode has finished, displaying the shooting standby screen ends. If not so, the processing proceeds to S721.

At S721, the system control portion 50 determines whether the shooting mode has been switched. If it determines that the shooting mode has been switched, the processing proceeds to S722. If not so, the processing returns to S709.

At S722, the system control portion 50 determines whether the current shooting mode is the movie shooting mode, as in S701. If it determines that the current shooting mode is the movie shooting mode, the processing proceeds to S723. If not so, the processing proceeds to S706.

At S723, the system control portion 50 displays the shooting standby screen. The flow for displaying the shooting standby screen is described in the processing described with reference to FIG. 6.

At S724, the system control portion 50 determines whether a shooting instruction has been provided, as in S716. If it determines that a shooting instruction has been provided, the processing proceeds to S725. If not so, the processing returns to S702.

At S725, the system control portion 50 performs still-image shooting processing, as in S719.

According to the present embodiment described above, a function desired for a user is displayed from among functions whose settings may be quickly changed during shooting in an area that can be operated by the user aiming the digital camera 100, whereas functions corresponding to the shooting mode are displayed in other areas. Among the functions whose settings can be changed, a function specified by the user can be displayed in a desired position in the custom display area that can be reached by the user in the state where they grips the grip portion 202. Accordingly, even in the state where the user grips the grip portion 202 or in the state where they aim the digital camera 100 being ready to provide a shooting instruction, the settings can be quickly changed during shooting and a desired image is obtainable. The functions whose settings cannot be changed during movie shooting, the functions whose settings are not changed until the shooting environment is not changed in shooting still images, the functions whose settings are not changed for a predetermined period, and the like are displayed in the mode-specific display area, which is more remote from the grip portion 202 than the custom display area, in the display portion 28. The functions displayed in the mode-specific display area are the functions whose settings are not changed during movie shooting or the like, and they are displayed in the left end in the screen so as not to interfere during the shooting. The functions whose settings can be changed are displayed in accordance with the mode, thus allowing the user to more quickly change the settings.

In specifying a function displayed in the custom display area, the user merely selects it from among the functions whose settings can be changed during shooting, and does not have to specify the displayed position in consideration of the circumstances about changing the settings for each function.

In the present embodiment, after an item is selected, a function to be assigned to that item is selected. An item to which a function is to be assigned may be selected after the function is selected.

In the case where a function displayed in the mode-specific display area in the movie shooting standby mode is selected, in response to the starting of the movie shooting, a description indicating that changing the settings of the selected function is disabled appears. In such a case, another function may be selected. That is, in response to the starting of the movie shooting, in the case where a function displayed in the mode-specific display area is selected, a function in the custom display area may be selected.

The display control device may be controlled by a single piece of hardware, or the entire device may be controlled by a plurality of pieces of hardware sharing the processing.

Aspects of the present invention are described based on the exemplary embodiments, but are not limited to these specific embodiments. Various forms within the scope of aspects of the present invention are included. The above-described embodiments are merely embodiments of the present invention, and the embodiments may also be combined.

In the above-described embodiments, an aspect where the present invention is used in the digital camera 100 is described as an example. Aspects of the present invention are not limited to this example and may also be used in a display control device that allows a user to select an item displayed in a display portion by a touching operation. That is, aspects of the present invention may be used in a cellular phone terminal, a portable image viewer, digital photo frame, music player, game machine, electronic book reader, and the like. In particular, it is effective that aspects of the present invention are used in portable equipment that require a user to have the grip portion and hold the equipment in using it.

Other Embodiments

Aspects of the present invention may also be achieved by performing the processing described below, that is, the processing for supplying software (program) achieving the functions in the above-described embodiments to a system or device over a network or through various storage media, reading the program code by a computer (or central processing unit (CPU), microprocessor unit (MPU), or the like) in the system or device, and executing it. In this case, the program and storage media storing the program are included in aspects of the present invention.

According to aspects of the present invention, the usability for displayed items in the state where the user holds and aims the device can be improved.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of International Patent Application No. PCT/JP2014/084429, filed Dec. 25, 2014, which is hereby incorporated by reference herein in its entirety.

The invention claimed is:

1. A display control device having a grip portion for holding the display control device on one side but not having any grip portion on the other side, comprising a memory and at least one processor which function as:
   a detection unit configured to detect a touching operation on a display portion;
   a control unit configured to perform control about an item displayed in a first display area or a second display area on the display portion in response to a touching operation on the item;
   a shooting control unit configured to perform control to shoot an image in an image pickup unit;
   a selection unit configured to select, based on an operation, one or more items from among a plurality of items, wherein the plurality of items are items whose settings are permitted to be changed during shooting; and
   a display control unit configured to perform control such that the items selected by the selection unit from among the plurality of items whose settings are permitted to be changed during shooting are displayed in the first display area and another plurality of items including predetermined items whose settings are not permitted to be changed during shooting are displayed in the second display area,
   wherein the first display area extends along a side nearest the grip portion among sides of the display portion, and the second display area is further from the grip portion than the first display area and
   wherein all of the items displayed in the first display area are items whose settings are permitted to be changed during shooting.

2. The display control device according to claim 1, wherein a shooting instruction portion being an operation member configured to provide an instruction to start the shooting is positioned to be operable with a finger of a hand on the grip portion, and the first display area is positioned to receive a touching operation with another finger of the hand.

3. The display control device according to claim 2, wherein the display control unit performs control such that in response to starting of shooting, a display manner used in items whose settings are not permitted to be changed during shooting displayed in the second display area is changed.

4. The display control device according to claim 2, further comprising a mode setting unit configured to set the currently used mode at any of a plurality of modes including a still-image mode for shooting still images or a movie mode for shooting movies,
   wherein the selection unit separately selects an item to be displayed in the first display area in the still-image mode and selects an item displayed to be in the first display area in the movie mode.

5. The display control device according to claim 1, further comprising a movie-mode switching unit configured to be able to switch a currently used mode to at least a first mode or a second mode from among modes included in a movie mode,
   wherein the display control unit performs control such that when the currently used mode is switched from the first mode to the second mode, a plurality of items displayed in the first display area in the first mode are displayed in the first display area in the second mode even in a case where settings of the items are not permitted to be changed in the second mode, and the display control unit performs control such that items whose settings are not permitted to be changed in the second mode, from among a plurality of items displayed in the second display area in the first mode, are not displayed in the second display area in the second mode.

6. The display control device according to claim 1, wherein the items displayed in the first display area and the items displayed in the second display area are in a same layer.

7. The display control device according to claim 1, wherein the selection unit selects the items to be displayed in the first area from among the plurality of items and selects display positions where the selected items are to be displayed in the first display area, and wherein the display control unit performs control such that the selected items are displayed at the selected display positions in the first display area.

8. The display control device according claim 1, wherein the first display area is a first end area of the display portion, and the second display area is a second end area different from the first end area.

9. The display control device according to claim 1, further comprising a settings changing unit configured to change contents of settings of the items displayed in the first display area and the items displayed in the second display area, wherein the display control unit performs control such that a settable option for a currently selected item from among the items displayed in the first display area and the items displayed in the second display area is displayed in a third display area in the display portion, and the settings changing unit changes the contents of the settings of the item in response to a selecting operation on the third display area.

10. The display control device according to claim 1, wherein at least one item from among the items displayed in the first display area and the items displayed in the second display area is displayed as a display item indicating contents of the settings specified in the item.

11. The display control device according to claim 1, further comprising an image pickup unit, wherein the display control unit performs control such that an image picked up by the image pickup unit is displayed in the display portion and such that the first display area and the second display area are arranged on opposite sides of a central portion of the image.

12. The display control device according to claim 1, wherein the first display area is positioned to receive a touching operation with a finger of a hand on the grip portion.

13. The display control device according to claim 1, wherein the first display area receives the touching operation by a hand holding the grip portion, and the second display area is an area extending along a side opposite to the side along which the first display area extends in the display portion.

14. The display control device according to claim 1, wherein, in the display portion, when the device is aimed by holding the grip portion with a hand and holding a holding portion different from the grip portion with another hand, the first display area includes an area reachable by a finger of the hand holding the grip portion and the second display area includes an area unreachable by a finger of the hand holding the holding portion.

15. The display control device according to claim 14, wherein the holding portion is a holding portion that holds a lens portion included in the device.

16. The display control device according to claim 14, wherein the holding portion is a holding portion for holding the main body portion, and the grip portion is a holding portion for holding the device in a state where operations on a plurality of operation members including an image pickup instruction portion are permitted.

17. The display control device according to claim 1, further comprising a mode setting unit configured to set a shooting mode, wherein the display control unit performs control such that only items whose settings are permitted to be changed in the shooting mode set by the mode setting unit are displayed in the second display area, and a plurality of items including items whose settings are not permitted to be changed in the shooting mode set by the mode setting unit but are permitted to be changed during are displayed in the first display area.

18. The display control device according to claim 17, wherein the display control unit performs control such that the items whose settings are not permitted to be changed in the shooting mode set by the mode setting unit, from among the plurality of items displayed in the first display area, are displayed in a display manner different from a display form in which the items whose settings are permitted to be changed are displayed.

19. The display control device according to claim 1, wherein all of the items displayed in the second display area are items whose settings are not permitted to be changed during shooting.

20. The display control device according to claim 1, wherein the shooting control unit performs control to store, in a storage medium, a movie captured by the image pickup unit from when an instruction to start shooting is provided to an end of the shooting.

21. A method for controlling a display control device having a grip portion for holding the display control device on one side but not having any grip portion on the other side, the method comprising:

a detection step of detecting a touching operation on a display portion;

a control step of performing control about an item displayed in a first display area or a second display area on the display portion in response to a touching operation on the item;

a shoot control step of performing control to shoot an image;

a selection step of selecting, based on an operation, one or more items from among a plurality of items, wherein the plurality of items are items whose settings are permitted to be changed during shooting; and a display control step of performing control such that the items selected in the selection step from among the plurality of items whose settings are permitted to be changed during shooting are displayed in the first display area and another plurality of items including predetermined items whose settings are not permitted to be changed during shooting are displayed in the second display area are displayed in the first display area and a plurality of predetermined items are displayed in the second display area, wherein the first display area extends along a side nearest the grip portion among sides of the display portion, and the second display area is further from the grip portion than the first display area, and wherein all of the items displayed in the first display area are items whose settings are permitted to be changed during shooting.

22. A non-transitory computer-readable storage medium that stores a program for causing a computer to execute a method for controlling a display control device having a grip portion for holding the display control device on one side but not having any grip portion on the other side, the method comprising:

a detection step of detecting a touching operation on a display portion;

a control step of performing control about an item displayed in a first display area or a second display area on the display portion in response to a touching operation on the item;

a shoot control step of performing control to shoot an image;

a selection step of selecting, based on an operation, one or more items from among a plurality of items, wherein the plurality of items are items whose settings are permitted to be changed during shooting; and a display control step of performing control such that the items selected in the selection step from among the plurality of items whose settings are permitted to be changed during shooting are displayed in the first display area and another plurality of items including predetermined items whose settings are not permitted to be changed during shooting are displayed in the second display area are displayed in the first display area and a plurality of predetermined items are displayed in the second display area, wherein the first display area extends along a side nearest the grip portion among sides of the display portion, and the second display area is further from the grip portion than the first display area, and wherein all of the items displayed in the first display area are items whose settings are permitted to be changed during shooting.

\* \* \* \* \*